(12) United States Patent
Hubbard

(10) Patent No.: US 6,891,802 B1
(45) Date of Patent: May 10, 2005

(54) NETWORK SITE TESTING METHOD AND ASSOCIATED SYSTEM

(75) Inventor: Edward A. Hubbard, Round Rock, TX (US)

(73) Assignee: United Devices, Inc., Austin, TX (US)

( * ) Notice: Subject to any disclaimer, the term of this patent is extended or adjusted under 35 U.S.C. 154(b) by 0 days.

(21) Appl. No.: 09/539,106

(22) Filed: Mar. 30, 2000

(51) Int. Cl.⁷ .............................................. H04L 12/26
(52) U.S. Cl. ...................... 370/241; 370/252; 709/201
(58) Field of Search ............................. 370/241, 241.1, 370/252; 235/383, 385, 375; 395/553, 557, 677, 187.01, 188.01; 380/3, 25; 705/10, 14, 15, 16, 25, 21, 26, 27; 707/102; 709/102, 201, 232

(56) References Cited

U.S. PATENT DOCUMENTS

| | | | |
|---|---|---|---|
| 4,669,730 A | 6/1987 | Small | 273/138 |
| 4,815,741 A | 3/1989 | Small | 273/138 |
| 5,056,019 A | 10/1991 | Schultz et al. | 364/405 |
| 5,332,218 A | 7/1994 | Lucey | 273/138 |
| 5,402,394 A | 3/1995 | Turski | 368/10 |
| 5,483,444 A | 1/1996 | Heintzeman et al. | 364/401 |
| 5,598,566 A | 1/1997 | Pascucci et al. | 395/750 |
| 5,655,081 A | 8/1997 | Bonnell et al. | 395/200.32 |
| 5,703,949 A | 12/1997 | Rosen | 380/21 |
| 5,740,549 A | 4/1998 | Reilly et al. | 705/14 |
| 5,768,504 A | 6/1998 | Kells et al. | 395/187.01 |
| 5,802,062 A | 9/1998 | Gehani et al. | 370/465 |
| 5,815,793 A | 9/1998 | Ferguson | 455/3.1 |
| 5,826,265 A | 10/1998 | Van Huben et al. | 707/8 |
| 5,842,219 A | 11/1998 | High, Jr. et al. | 707/103 |
| 5,862,325 A | 1/1999 | Reed et al. | 395/200.31 |
| 5,884,072 A | 3/1999 | Rasmussen | 395/600 |
| 5,887,143 A | 3/1999 | Saito et al. | 395/200 |
| 5,893,075 A | 4/1999 | Plainfield et al. | 705/14 |
| 5,909,540 A | 6/1999 | Carter et al. | 395/182.02 |
| 5,916,024 A | 6/1999 | Von Kohorn | 463/40 |
| 5,918,229 A | 6/1999 | Davis et al. | 707/10 |
| 5,921,865 A | 7/1999 | Scagnelli et al. | 463/17 |
| 5,937,192 A | 8/1999 | Martin | 395/705 |
| 5,958,010 A | 9/1999 | Agarwal et al. | 709/224 |
| 5,964,832 A | 10/1999 | Kisor | 709/202 |
| 5,966,451 A | 10/1999 | Utsumi | 380/49 |
| 5,970,469 A | 10/1999 | Scroggie et al. | 705/14 |
| 5,970,477 A | 10/1999 | Roden | 705/32 |
| 5,978,594 A | 11/1999 | Bonnell et al. | 395/837 |
| 5,987,506 A | 11/1999 | Carter et al. | 709/213 |
| 6,003,065 A | 12/1999 | Yan et al. | 709/201 |
| 6,009,455 A | 12/1999 | Doyle | 709/201 |
| 6,014,634 A | 1/2000 | Scroggie et al. | 705/14 |
| 6,024,640 A | 2/2000 | Walker et al. | 463/17 |

(Continued)

FOREIGN PATENT DOCUMENTS

| WO | WO 01/14961 A2 * | 3/2000 |
|---|---|---|
| WO | 01/14961 | 3/2001 |
| WO | 01/73545 | 10/2001 |

OTHER PUBLICATIONS

Caronni, et al., "How Exhausting is Exhaustive Search?" RSA Laboratories' CryptoBytes, vol. 2, No. 3, pp. 2–6, Jan.–Mar. 1997.

Bricker, et al., "Condor Technical Summary," Computer Sciences Dept., University of Wisconsin, Version 4.1b, pp. 1–10, Jan. 28, 1992.

(Continued)

*Primary Examiner*—Wellington Chin
*Assistant Examiner*—Mark A Mais
(74) *Attorney, Agent, or Firm*—Winstead Sechrest & Minick P.C.

(57) ABSTRACT

A method for network site testing and associated distributed parallel processing system are disclosed that identifies the capabilities of distributed devices connected together through a wide variety of communication systems and networks and utilizes those capabilities to provide incentives to the distributed devices and to organize, manage and distribute project workloads to the distributed devices.

26 Claims, 8 Drawing Sheets

U.S. PATENT DOCUMENTS

| | | | | |
|---|---|---|---|---|
| 6,026,474 | A | | 2/2000 | Carter et al. ................. 711/202 |
| 6,052,584 | A | * | 4/2000 | Harvey et al. ............... 455/423 |
| 6,052,785 | A | | 4/2000 | Lin et al. ..................... 713/201 |
| 6,058,393 | A | | 5/2000 | Meier et al. ................... 707/10 |
| 6,061,660 | A | | 5/2000 | Eggleston et al. ............ 705/14 |
| 6,070,190 | A | | 5/2000 | Reps et al. ................. 709/224 |
| 6,078,953 | A | * | 6/2000 | Vaid et al. ................... 709/223 |
| 6,094,654 | A | | 7/2000 | Van Huben et al. ............ 707/8 |
| 6,112,181 | A | | 8/2000 | Shear et al. ..................... 705/1 |
| 6,112,225 | A | | 8/2000 | Kraft et al. ................. 709/202 |
| 6,112,304 | A | | 8/2000 | Clawson ...................... 713/156 |
| 6,115,713 | A | | 9/2000 | Pascucci et al. ............... 707/10 |
| 6,148,335 | A | | 11/2000 | Haggard et al. ............ 709/224 |
| 6,148,377 | A | | 11/2000 | Carter et al. ................. 711/147 |
| 6,151,684 | A | | 11/2000 | Alexander et al. ............. 714/4 |
| 6,374,254 | B1 | | 4/2002 | Cochran et al. ............ 707/102 |
| 6,418,462 | B1 | | 7/2002 | Xu .............................. 709/201 |
| 6,421,781 | B1 | * | 7/2002 | Fox et al. .................... 713/201 |
| 6,463,457 | B1 | | 10/2002 | Armentrout et al. ........ 709/201 |

OTHER PUBLICATIONS

Fields, "Hunting for Wasted Computing Power–New Software for Computing Networks Puts Idle PC's to Work," 1993 Research Sampler, University of Wisconsin, pp. 1–5, 1993.

Anderson, et al., "SETI@home: Internet Distributed Computing for SETI," A New Era in Bioastronomy, ASP Conference Series, vol. 213, pp. 511–517, 2000.

Bowyer, et al., "Twenty Years of Serendip, the Berkeley SETI Effort: Past Results and Future Plans," Astronomical and Biochemical Origins and the Search for Life in the Universe, pp. 667–676, 1997.

Litzkow, et al., "Condor—A Hunter of Idle Workstations," The 8$^{th}$ International Conf. on Distributed Computing Systems, pp. 104–111, 1988.

Hamidzadeh, et al., "Dynamic Scheduling Techniques for Heterogeneous Computing Systems," Concurrency: Practice and Experience, vol. 7(7), pp. 633–652, 1995.

Grimshaw, et al., "The Legion Vision of a Worldwide Virtual Computer," Communications of the ACM, vol. 40, No. 1, pp. 39–45, 1997.

Catlett, et al., "Metacomputing," Communications of the ACM, vol. 35, No. 6, pp. 44–52, 1992.

Foster, et al., "Globus: A Metacomputing Infrastructure Toolkit," The International Journal of Supercomputing Applications and High Performance Computing, vol. 11, No. 2, pp. 115–128, 1997.

Mutka, et al., "The Available Capacity of a Privately Owned Workstation Environment," Performance Evaluation 12 (1991) pp. 269–284.

Sullivan, et al., "A New Major SETI Project Based on Project Serendip Data and 100,000 Personal Computers," Astronomical and Biochemical Origins and the Search for Life in the Universe, 5$^{th}$ International Conference on Bio-astronomy, IAU Colloquium No. 161, pp. 729–734, 1996.

Gelernter, "Domesticating Parallelism," IEEE Computer, Aug. 1986 19(8), pp. 12–16.

Goldberg, et al., "A Secure Environment for Untrusted Helper Applications–Confining the Wily Hacker," 6$^{th}$ USENIX Security Symposium, pp. 1–13, 1996.

distributed.net: The fastest computer on Earth: Feb. 8, 1999, http://web.archive.org/web/19990221230053/http://distributed.

London et al., "POPCORN—A Paradigm for Global–Computing", Thesis University Jerusalem, Jun. 1998.

Takagi H. et al., "Ninflet: a migratable parallel objects framework using Java," Java for High–Performance Network Computing, Syracuse, NY, USA, Feb. 1998, vol. 10, No. 11–13, pp 1063–1078.

Waldspurger, C.A. et al., "Spawn: a distributed computational economy" IEEE Transactions on Software Engineering, IEEE Inc., NY, US, Feb. 1992, vol. 18, No. 2, pp. 103–117.

Neary, M. O., et al., "Javelin: Parallel computing on the internet" Future Generations Computer Systems, Elsevier Science Publishers, Amsterdam, NL, Oct. 1999, vol. 15, No. 5–6, pp. 661–664.

Foster, Ian et al., "The Physiology of the Grid," This is a DRAFT document and continues to be revised. Version Feb. 17, 2002.

Douceur, John R. et al., "A Large–Scale Study of the File–System Contents," Microsoft Research, Redmond, WA 98052, May 1999.

Bolosky, William J. et al., "Feasibility of a Serverless Distributed File System Deployed on an Existing Set of Desktop PCs," Microsoft Research, Redmond, WA 98052, Jun. 2000.

Regev, Ori; Economic Oriented CPU Sharing System for the Internet; Master of Science in Computer Science thesis; Institute of Computer Science; The Hebrew University of Jerusalem; Jul., 1998.

May, Michael; Idle Computing Resources as Micro–Currencies—Bartering CPU Time for Online Content; AACE WebNet99; Oct. 25–30, 1999.

May, Michael; Distributed RC5 Decryption as a Consumer for Idle—Time Brokerage; DCW99 Workshop on Distributed Computer on the Web; Jun. 21–23, 1999.

May, Michael; Locust—A Brokerage System for Accessing Idle Resources for Web–Computing; Proceedings of the 25$^{th}$ Euromicro Conference; vol. 2, pp. 466–473; Sep. 8–10, 1999.

Huberman, Bernardo A., et al.; Distributed Computation as an Economic System; Journal of Economic Perspectives; vol. 9, No. 1; pp. 141–152; Winter 1995.

U.S. Appl. No. 09/872,251 entitled "Massively Distributed Database System And Associated Method".

U.S. Appl. No. 09/794,969, entitled "System And Method For Monitizing Network Connected User Bases Utilizing Distributed Processing Systems" and.

U.S. Appl. No. 09/834,785 entitled "Software–Based Network Attached Storage Services Hosted On Massively Distributed Parallel Computing Networks".

Brian Hayes, "Computing Science: Collective Wisdom," American Scientist, Mar.–Apr. 1998.

Steve Lawrence, et al., "Accessibility of information on the web," Nature, vol. 400, pp. 107–109, Jul. 1999.

Steve Lawrence, et al, "Searching the World Wide Web," Science, vol. 280, pp. 98–100, Apr. 3, 1998.

Steve Lawrence, et al., "Context and Page Analysis for Improved Web Search," IEEE Internet Computing, pp. 38–46, Jul.–Aug. 1998.

Vasken Bohossian, et al., "Computing in the RAIN: A Reliable Array of Independent Nodes," California Institute of Technology, Sep. 24, 1999.

"A White Paper: The Economic Impacts of Unacceptable Web–Site Download Speeds," Zona Research, Inc., pp. 1–17, Apr. 1999.

Peter J. Sevcik, "The World–Wide–Wait Status Report," *Northeast Consulting Resources, Inc.,* Global Internet–Performance Conference, Oct. 14, 1999.

"White Paper: Max, and the Objective Measurement of Web Sites," WebCriteria, Version 1.00, pp. 1–11, Mar. 12, 1999.

Renu Tewari, et al., "Design Considerations for Distributed Caching on the Internet," pp. 1–13, May 1999.

"Measuring and Improving Your E–Commerce Web Site Performance with Keynote Perspective," Keynote Systems, pp. 1–15, Mar. 29, 2000.

Sullivan, et al., "A New Major SETI Project Based On Project Serendip Data and 100,000 Personal Computers," Proc of the Fifth Intl Conf on Bioastronomy IAU Colloq No. 161, pp. 729–734, 1997.

U.S. Appl. No. 09/538,543, entitled "Distributed Parallel Processing System Having Capability–Based Incentives and Associated Method".

U.S. Appl. No. 09/539,023, entitled "Sweepstakes Incentive Model and Associated System".

U.S. Appl. No. 09/539,448, entitled "Capability–Based Distributed Parallel Processing System and Associated Method".

U.S. Appl. No. 09/539,428, entitled "Method of Managing Distributed Workloads and Associated System".

U.S. Appl. No. 09/539,106, entitled "Network Site Testing Method and Associated System".

U.S. Appl. No. 09/538,542 entitled "Network Site Content Indexing Method and Associated System".

U.S. Appl. No. 09/539,107 entitled "Distributed Back–Up System and Associated Method".

U.S. Appl. No. 09/603,740, entitled "Method of Managing Workloads and Associated Distributed Processing System".

U.S. Appl. No. 09/602,789, entitled "Machine Generated Sweepstakes Entry Model and Associated DIstributed Processing System".

U.S. Appl. No. 09/602,803, entitled "Data Sharing and File Distribution Method and Associated Distributed Processing System".

U.S. Appl. No. 09/602,844, entitled "Data Conversion Services and Associated Distributed Processing System".

U.S. Appl. No. 09/602,983, entitled "Customer Services And Advertising Based Upon Device Attributes and Associated Distributed Processing System".

U.S. Appl. No. 09/648,832, entitled "Security Architecture For Distributed Processing Systems and Associated Method".

* cited by examiner

NETWORK SITE TESTING METHOD AND ASSOCIATED SYSTEM

TECHNICAL FIELD OF THE INVENTION

This invention relates distributing project workloads among a multitude of distributed devices and more particularly to techniques and related methods for managing, facilitating and implementing distributed processing in a network environment.

BACKGROUND

Prior processing systems have included the technique of multiple users within a company sharing processing time available on a mainframe or central processing system. Using small segments of mainframe processing time, departments within the company would often incur costs associated with using the processing time, which in turn was billed back to each department from the central information technology (IT) organization for the company. In other instances, a company could pay for and utilize processing time made available by third-party companies who possessed an over-capacity of mainframe processing power. These third-party companies would, in effect, create a market for the mainframe processing time that went unused by the internal organizations of that third-party company.

Prior processing techniques have also included distributed processing projects that have utilized the Internet or World Wide Web. These distributed processing research projects have used a multitude of personal computers (PCs) connected to the Internet to provide processing power to accomplish research project goals. Research project goals have been, for example, identifying large prime numbers, analyzing radio telescope data, and analyzing code keys in an encryption deciphering contest.

One example of a distributed processing project on the Internet is a research project housed at the University of California at Berkeley to analyze sky recording data gathered by SETI (the Search for Extraterrestrial Intelligence). This sky recording data has been gathered for some time from the large Arecibo Radio Telescope in Puerto Rico. The processing power needed to analyze these data recordings was very large. At the peak of SETI's capture activities, SETI had accumulated over 100,000 years of signals to process, as measured by the compute power necessary to process all the signals. To analyze this data, software was developed that could be downloaded to Internet connected PCs so that these PCs could process small slices of these sky recordings. In under a year, this project, called SETI@home (URL in March 2000—www.setiathome.ssl.berkeley.edu) has completely processed this backlog of data and is now returning to the sky recording dataset for further processing tasks. This massively parallel distributed system currently has a processing throughput of over 10 TFLOPs (terraFLOPS or $10^{12}$ floating point operations per second) running on about 1.8 million Internet connected machines.

Another example of a distributed processing technique was developed and implemented by Distributed.net (URL in March 2000—www.distributed.net) to compete in encryption breaking contests. Distributed.net created and distributed a client software program which may be downloaded by client systems connected to the Internet. This client software then acts as part of a large distributed processing system specifically designed to break encrypted messages on the Internet. Using this processing technique, Distributed.net has won encryption breaking contests sponsored by RSA Labs, which is an Internet security company. In these contests, RSA Labs has offered a monetary prize to the winner of the encryption contest. In organizing its efforts, Distributed.net has offered a share of this monetary prize to the client system that actually breaks the encryption code. In addition, Distributed.net keeps track of overall project statistics, as well as statistics concerning the efforts of its client systems through individual and team rankings by amount of processing completed.

Entropia.com (URL in March 2000—www.entropia.com) has utilized an Internet distributed processing system to compete in contests directed to identifying the largest prime number. Entropia.com also offers its computing power to other research projects. Users may sign on to be part of the distributed processing for free. For the largest prime number contest, Entropia.com, like Distributed.net, offers a monetary prize to the Internet connected PC that comes up with the first prime number achieved in a new order of magnitude. For other research projects, the incentive is simply to be a part of the research project.

Another distributing processing web site is provided by Process Tree Network (URL in March 2000—www.processtree.com). This web site is attempting to sign-up Internet connected computer systems to provide processing power for paying projects. For a project, each partner system, when connected to the Internet, will have client software that downloads a job unit and processes that job unit. The incentive offered by the Process Tree Network are "micro-payments" for the amount of work completed by any given system. These micro-payments are apparently small amounts of some total project value based upon the amount of the project completed by the given system through the jobs it has processed. In addition, each partner is given a bonus percentage of payments made to persons they sign-up as new partners.

In completely unrelated Internet activities outside the distributed processing arena, there have been a number of sites that have utilized a sweepstakes model as an incentive for consumer behavior. One of the most popular (currently, as of March 2000) sweepstakes sites is IWON.COM (www.iwon.com) IWON.COM is a standard Internet search and content portal that provides an incentive to users by giving them entries to a sweepstakes when the users use the portal. The more the users use the portal, the more entries the user generates, up to a limit, for example, up to 100/day. Currently (as of March 2000), at the end of each day, IWON.COM has chosen a $10,000 winner from among the entries. At the end of each month, IWON.COM has chosen a $1,000,000 winner. And, at the end of the current sweeps period (as of March 2000), IWON.COM plans to draw a single winner for a $10,000,000 grand prize. IWON.COM has created this sweepstakes model to introduce an Internet portal in late 1999 and make it a web site that has as a comparable number of people using it as does Internet portals that have existed for many years, such as, for example. Yahoo.com (URL in March 2000—www.yahoo.com).

Significantly, these prior distributed processing projects have failed to fully utilize the capabilities of connected distributed devices.

SUMMARY OF THE INVENTION

The present invention provides a method for network site testing with a distributed parallel processing system that identifies the capabilities of distributed devices connected together through a wide variety of communication systems and networks and utilizes those capabilities to provide incentives to the distributed devices and to organize, manage and distribute project workloads to the distributed devices.

In one broad respect, the present invention is a method of testing a network site that is coupled to a network, including providing a server system, coupling the server system to a network, the network being configured to be coupled to distributed devices, and utilizing the server system to distribute and schedule site testing workloads for a plurality of the distributed devices to test content delivery from a network site.

In another broad respect, the present invention is a network site testing distributed processing system, including a first system coupled to a network configured to be coupled to distributed devices, and a workload database coupled to the server system storing workloads for site testing, the first system scheduling the site testing workloads for the distributed devices to test content delivery for a network site.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention contemplates the identification of the capabilities of distributed devices connected together through a wide variety of communication systems and networks and the aggregation of these capabilities to accomplish processing, storage, broadcasting or any other desired project objective. For example, distributed devices connected to each other through the Internet, an intranet network, a wireless network, or any other network may provide any of a number of useful capabilities to third parties once their respective capabilities are identified, organized, and managed for a desired task. These distributed devices may be connected personal computer systems (PCs), internet appliances, notebook computers, servers, storage devices, network attached storage (NAS) devices, wireless devices, hand-held devices, or any other computing device that has useful capabilities and is connected to a network in any manner. The present invention further contemplates providing an incentive, which may be based in part upon capabilities of the distributed devices, to encourage users and owners of the distributed devices to allow the capabilities of the distributed devices to be utilized in the distributed parallel processing system of the present invention.

The number of usable distributed devices contemplated by the present invention is preferably very large. Unlike a small local network environment, for example, as may be used by an Internet Service Provider (ISP), which may include less than 100 interconnected computers systems to perform the tasks required by the ISP, the present invention preferably utilizes a multitude of widely distributed devices to provide a massively distributed processing system. With respect to the present invention, a multitude of distributed devices refers to greater than 1,000 different distributed devices. With respect to the present invention, widely distributed devices refers to a group of interconnected devices of which at least two are physically located at least 100 miles apart. With respect to the present invention, a massively distributed processing system is one that utilizes a multitude of widely distributed devices. The Internet is an example of a interconnected system that includes a multitude of widely distributed devices. An intranet system at a large corporation is an example of an interconnected system that includes multitude of distributed devices, and if multiple corporate sites are involved, may include a multitude of widely distributed devices. A distributed processing system according to the present invention that utilizes such a multitude of widely distributed devices, as are available on the Internet or in a large corporate intranet, is a massively distributed processing system according to the present invention.

Figure 1A:
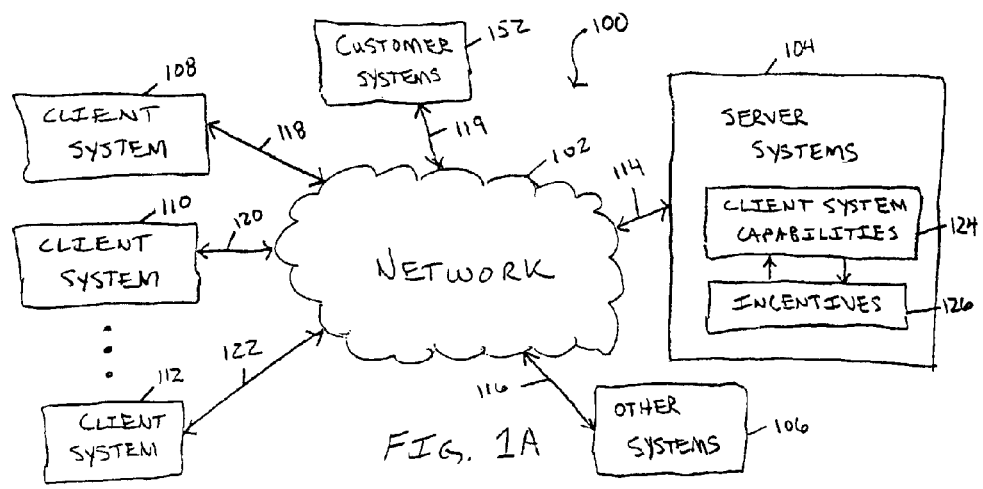
FIG. 1A is a block diagram for a distributed processing system having client capability and incentive features, according to the present invention.

FIG. 1A is a block diagram for a distributed parallel processing system 100 according to the present invention. The network 102 is shown having a cloud outline to indicate the unlimited and widely varying nature of the network and of attached client types. For example, the network 102 may be the Internet, an internal company intranet, a local area network (LAN), a wide area network (WAN), a wireless network, or any other system that connects together multiple systems and devices. In addition, network 102 may include any of these types of connectivity systems by themselves or in combination, for example, computer systems on a company intranet connected to computer systems on the Internet.

FIG. 1A also shows client systems 108, 110 . . . 112 connected to the network 102 through communication links 118, 120 . . . 122, respectively. In addition, server systems 104, other systems 106, and customer systems 152 are connected to the network 102 through communication links 114, 116 and 119, respectively. The client system capabilities block 124 is a subset of the server systems 104 and represents a determination of the capabilities of the client systems 108, 110 . . . 112. The incentives block 126 is also a subset of the server systems 104 and represents an incentive provided to the users or owners of the clients systems 108, 110 . . . 112 for allowing capabilities of the clients systems 108, 110 . . . 112 to be utilized by the distributed processing system 100. The client systems 108, 110 and 112 represent any number of systems and/or devices that may be identified, organized and utilized by the server systems 104 to accomplish a desired task, for example, personal computer systems (PCs), internet appliances, notebook computers, servers, storage devices, network attached storage (NAS) devices, wireless devices, hand-held devices, or any other computing device that has useful capabilities and is connected to a network in any manner. The server systems 104 represent any number of processing systems that provide the function of identifying, organizing and utilizing the client systems to achieve the desired tasks.

The incentives provided by the incentives block 126 may be any desired incentive. For example, the incentive may be a sweepstakes in which entries are given to client systems 108, 110 . . . 112 that are signed up to be utilized by the distributed processing system 100. Other example incentives are reward systems, such as airline frequent-flyer miles, purchase credits and vouchers, payments of money, monetary prizes, property prizes, free trips, time-share rentals, cruises, or any other desired incentive or reward.

As indicated above, any number of other systems may also be connected to the network 102. The element 106, therefore, represents any number of a variety of other systems that may be connected to the network 102. The other systems 106 may include ISPs, web servers, university computer systems, and any other distributed device connected to the network 102, for example, personal computer systems (PCs), internet appliances, notebook computers, servers, storage devices, network attached storage (NAS) devices, wireless devices, hand-held devices, or any other connected computing device that has useful capabilities and is connected to a network in any manner. The customer systems 152 represents customers that have projects for the distributed processing system, as further described with respect to FIG. 1B. The customer systems 152 connect to the network 102 through the communication link 119.

It is noted that the communication links 114, 116, 118, 119, 120 and 122 may allow for communication to occur, if desired, between any of the systems connected to the network 102. For example, client systems 108, 110 . . . 112 may communicate directly with each other in peer-to-peer type communications. It is further noted that the communication links 114, 116, 118, 119, 120 and 122 may be any desired technique for connecting into any portion of the network 102, such as, Ethernet connections, wireless connections, ISDN connections, DSL connections, modem dial-up connections, cable modem connections, direct T1 or T3 connections, routers, portal computers, as well as any other network or communication connection. It is also noted that there are any number of possible configurations for the connections for network 102, according to the present invention. The client system 108 may be, for example, an individual personal computer located in someone's home and may be connected to the Internet through an Internet Service Provider (ISP). Client system 108 may also be a personal computer located on an employee's desk at a company, may be connected to an intranet through a network router, and may be connected to the Internet through a second router or portal computer. Client system 108 may further be personal computers connected to a company's intranet, and the server systems 104 may also be connected to that same intranet. In short, a wide variety of network environments are contemplated by the present invention on which a large number of potential client systems are connected.

Figure 1B:
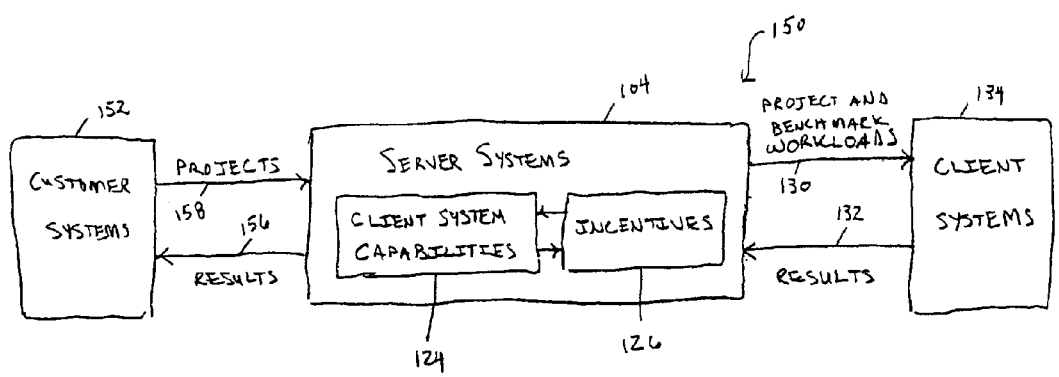
FIG. 1B is a block diagram for information flow among customer systems, server systems and client systems, according to the present invention.

FIG. 1B is a block diagram information flow 150 among customer systems 152, server systems 104 and client system 134, according to the present invention. The server systems 104, as discussed above, may include any number of different subsystems or components, as desired, including client system capabilities block 124 and incentives block 126. The server systems 104 send project and benchmark workloads 130 to client systems 134. A benchmark workload refers to a standard workload that may be used to determine the relative capabilities of the client systems 134. A project workload refers to a workload for a given project that is desired to be completed. The project workload may be, for example, a workload for projects such as network site content indexing, network site testing including network site load testing and network site quality of service testing, data back-up, bioinformatics including genetic and biological analyses, pair-wise comparisons including fingerprint and DNA analyses, data mining, or any other desired project.

Client systems 134, as discussed above, may be any number of different systems that are connected to the server systems 104 through a network 102, such as client systems 108, 110 . . . 112 in FIG. 1A. The client systems 134 send results 132 back to the server systems 104 after the client systems 134 complete processing any given workload. Depending upon the workload project, the server systems 104 may then provide results 156 to customer systems 152. The customer systems 152 may be, for example, an entity that desires a given project to be undertaken, and if so, provides the project details and data 158 to the server systems 104.

Figure 2A:
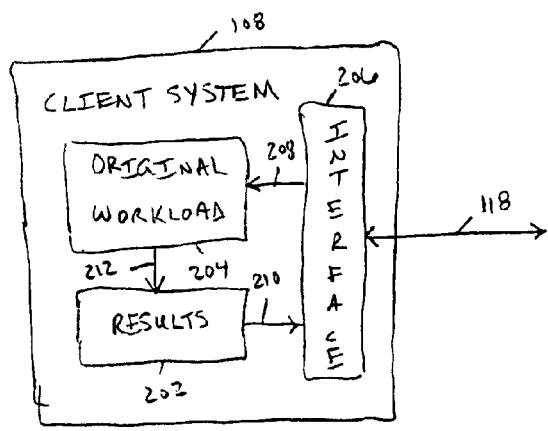
FIG. 2A is a block diagram for a client system, according to the present invention.

FIG. 2A is a block diagram for an example client system 108 according to the present invention. In this simplified block diagram, an original workload 204 is received through line 208 from an interface 206. The original workload 204 represents a portion of the processing, storage or other activity required to complete the desired task for which the server system 104 is trying to accomplish. This original workload 204 is sent by the server system 104 through the network 102 and received by the client system 108 through communication link 118. The client system 108 processes the original workload 204. Following line 212, results 202 are then stored for transferring along line 210 to interface 206. Interface 206 may then communicate the results back to the server system 104 through communication line 118, or to other client systems (for example, with peering of client systems) and then through the network 102.

It is noted that the workload received by client system 108 and the processing or activity performed may depend up a variety of factors, as discussed further below. In part, this workload allocated by the server system 104 to each client system 108, 110 and 112 may depend upon the capabilities of the client system, such as the processing power, disk storage capacity, communications types, and other capabilities available from the various components of the systems within the client system 108.

The server systems 104 can select the workloads for the client system 108 and may control when these workloads are performed, through an operational code (i.e., an agent) residing and installed on the client system 108. Alternatively, the owner or user of the client system 108 may determine when workloads are procured or obtained from the server systems 104, as well as when these workloads are performed, for example, by accessing the server systems 104 through the network 102. For example, the sever system 104 may download to the client system 108 upon request one or more workloads. At the same time, an agent residing on the client system 108 may operate to process the workload or multiple workloads downloaded to the client system 108. It is noted, therefore, that the agent may be simultaneously managing more than one workload for any number of projects. When the workload is complete, the agent may inform the owner or user of the client system 108 the results are ready to be communicated back. The client system 108 may then upload results to the server system 104 and download new workloads, if desired. Alternatively, these logistical and operational interactions may take place automatically through control of the agent and/or the server systems 104.

Figure 2B:
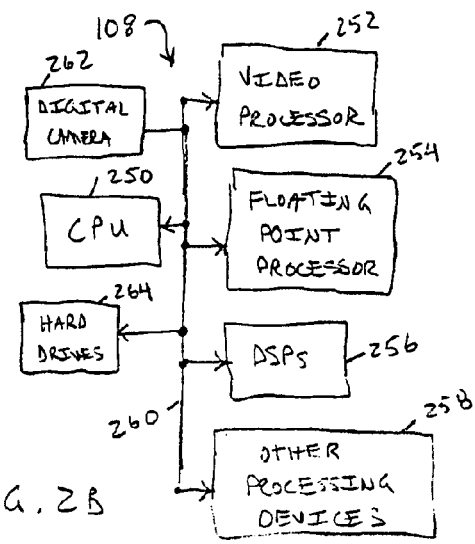
FIG. 2B is a block diagram for processing elements within a client system, according to the present invention.

FIG. 2B is a block diagram for processing elements within a client system 108 according to the present invention. In this diagram, client system 108 is contemplated as a personal computer. In a personal computer, an internal bus 260 would typically have a variety of different devices connected to it. For example, a CPU 250 could be connected through the bus 260 to a video processor 252, a floating point processor 254 (often integrated within the CPU itself), and digital signal processors (DSPs), such as those found on sound cards and modems. In addition, any of a variety of other processing devices 258 may be included. Furthermore, other types of devices may be connected, such as hard drives 264, which provide disk storage capabilities, and a digital camera 262.

It is noted, therefore, that the capabilities for client systems 108, 110 . . . 112 may span the entire range of possible computing, processing, storage and other subsystems or devices that are connected to a system connected to the network 102. For example, these subsystems or devices may include: central processing units (CPUs), digital signal processors (DSPs), graphics processing engines (GPEs), hard drives (HDs), memory (MEM), audio subsystems (ASs), communications subsystems (CSs), removable media types (RMs), and other accessories with potentially useful unused capabilities (OAs). In short, for any given computer system connected to a network 102, there exists a variety of capabilities that may be utilized by that system to accomplish its direct tasks. At any given time, however, only a fraction of these capabilities are typically used on the client systems 108, 110 . . . 112. The present invention can take advantage of these unused capabilities.

It is also noted that along with receiving the workload, the client system 108 will also receive an agent that manages the completion of the workload. This agent may be software that is customized for the particular computer system and processing capabilities of the client system 108. For example, if the client system is a personal computer as shown in FIG. 2B, the agent may be a program that operates in the background of the computer's operating system. When the agent determines that there is unused processing or other capabilities, the agent may take advantage of it. For example, if the user is using a word processing application to create a document, little processing power is being utilized by the word processing program, leaving the computer's CPU and video processor underutilized. Thus, the agent could execute commands to these processors during dead cycles. In this way, the agent may facilitate the completion of workload processing in a reduced time. In addition, this agent may be self-updating upon connecting to the server systems 104, so that the agent may be kept up to date with current software revisions and workload activities. It is also noted that the agent may manage work on multiple workloads at the same time, so that any given distributed device connected to the network 102 may be working on a plurality of workloads at any given time.

Figure 2C:
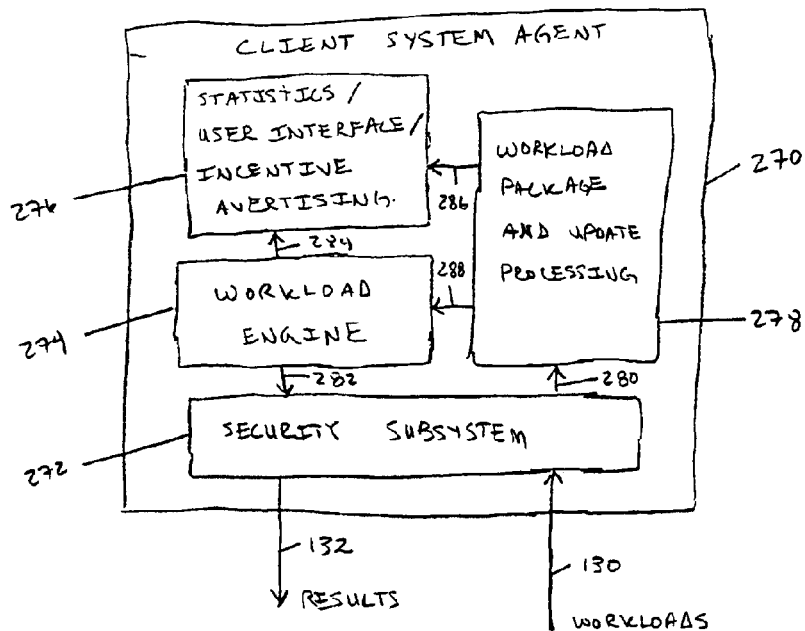
FIG. 2C is a block diagram for a client system agent installed on a client system, according to the present invention.

FIG. 2C is a block diagram for an example client system agent 270. The agent 270 may include a security subsystem 272 that controls the interface of the client system 108 with the agent 270. The security subsystem 272 may help keep the workloads secure and may help to keep the client systems 108 from suffering any security problems in completing the workload. For example, the agent 272 may operate to keep viruses from attacking the client system 108 while the client system 108 is processing the workload through the operation of the agent. The security subsystem 272, therefore, may provide the interface for the workloads 130 and the results 132.

The clients system agent 270 may also include a workload engine 274, a statistics/user interface/incentive advertising block 276, and a workload package and update processing block 278. In the example shown in FIG. 2C, workloads 130 pass through the security subsystem 272 and along line 280 to the workload package and update processing block 278. In this block 278, the agent 270 may be updated by the server systems 104. Alternatively, the agent 270 may determine, when connected to the server systems 104, whether it needs to be updated and then accomplish that updating automatically. Once the workload package is processed, the workload engine 274 may receive the workload following line 288. The workload engine 274 works on the workload, ultimately completing the workload. The results or status of the workload may then be sent through the security subsystem 272 following line 282. The results 132 may then be provided back to the server systems 104.

The statistics/user interface/incentive advertising block 276 may provide workload, incentive and other statistics, as well as any other desired interface features, to the user of the client system. For example, the block 276 may show a user the expected amount of processing time it will take for the client system to complete a workload task based upon the capabilities of the system. As also shown, the block 276 may receive information following lines 286 and 284 from the workload package and update processing block 278 and from the workload engine 274. If desired, security information from the security subsystem 272 could also be displayed to the user of the client system. It is noted that the information displayed to the user of the client system may be modified and selected as desired without departing from the present invention.

With respect to incentive advertising, the block 276 may also show the user of the client system how this processing time might change depending upon various possible upgrades to the capabilities of the client system, such as a faster microprocessor, more memory, more disk storage space, etc. Furthermore, the client system capabilities may be shown correlated to the incentives provided to the client system for participation. Thus, the user may be provided information as to how the user's incentives would increase or change depending upon other computer systems or upgraded capabilities the user could acquire. This incentive value increase may also be tied to upgrades to particular vendor's devices. For example, if the user's device is a computer system having an ABC microprocessor, the block 276 may provide the user information as to increased incentive values based upon an upgrade to a more powerful ABC microprocessor. Similarly, if the user's device is a computer system obtained from ABC, the block 276 may provide the user information as to increased incentive values based upon an upgrade to a more powerful ABC computer system.

Figure 2D:
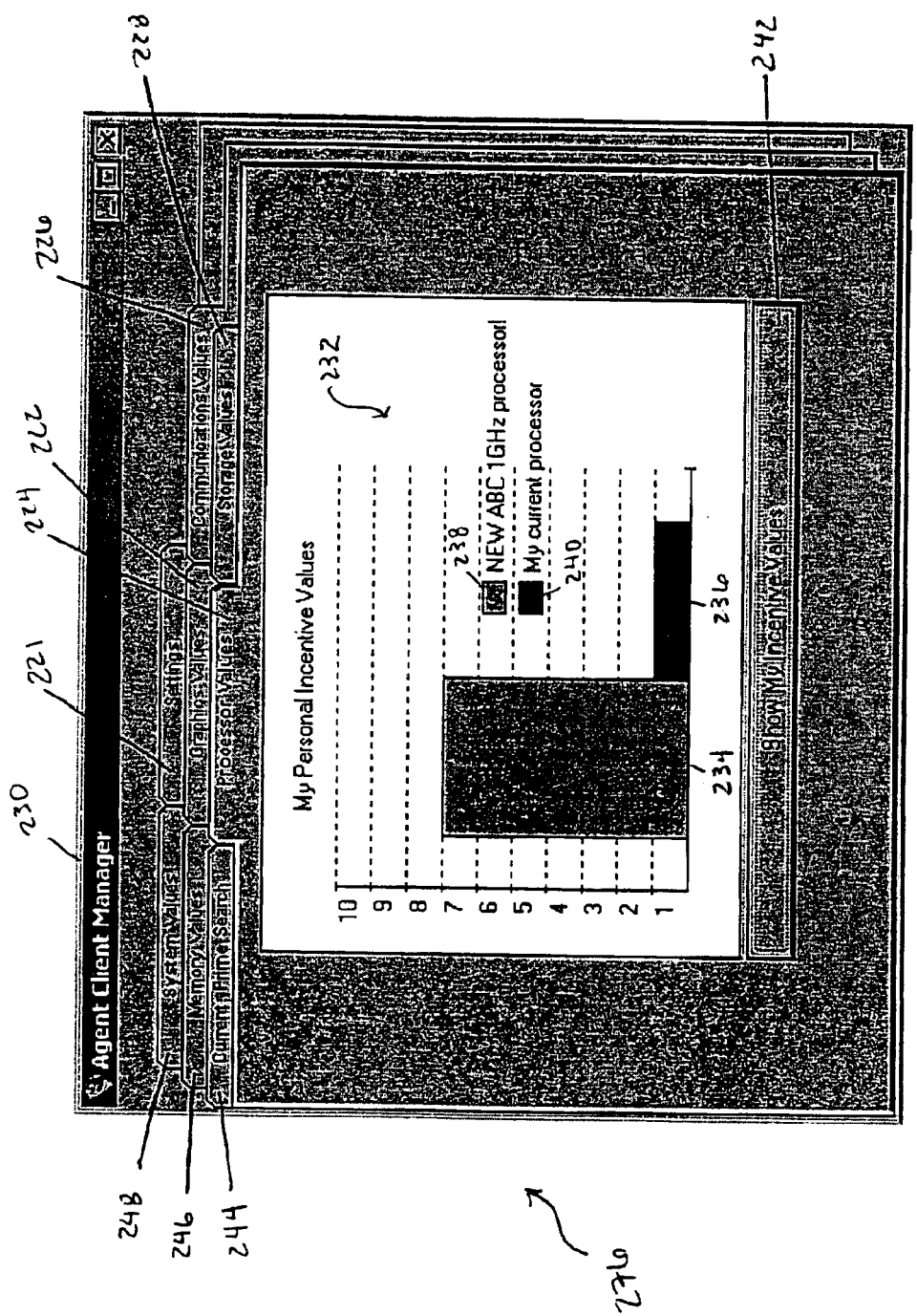
FIG. 2D is an example user interface for a client system agent, including incentive advertising, according to the present invention.

FIG. 2D is a an example user interface 276 for a client system agent, including incentive advertising, according to the present invention. In the example shown, interface 276 is a window 230 that may be displayed on a distributed device, for example, a computer system. This window 230 displays the desired information for the agent client manager. As indicated above, this agent client manager is initially downloaded from the server systems 104 and thereafter may be updated at various times when the client system is communicating with the server systems. The interface 276, as shown, includes interface tabs 221, 222, 224, 226, 228, 244, 246 and 248. These interface tabs may be selected through the user of a pointing device or keyboard attached, for example, to a computer system graphically displaying the window 230. It is noted that the interface tabs 221, 222, 224, 226, 228, 244, 246 and 248 are only examples, and the number, arrangement and content of tabs may be modified as desired. In addition, the example user interface 276 depicted in FIG. 2D is only an example and may be modified as desired.

In FIG. 2D, the processor values interface tab 224 is the one currently selected by the user. This tab 224 (Processor Values) includes example information that may be displayed to the user. Assuming that a workload is being processed by the agent client manager, the user may select the button 242 (Show My Incentive Values) to show the user's current incentive values associated with the workload being performed. The personal incentive values chart 232 (My Personal Incentive Values) may then be displayed to the user. As shown, the incentive values are provided in a relative scale from 1 to 10. The key designation 240 represents the incentives associated with the users current central processing unit (CPU) or microprocessor.

As indicated above, this incentive information may also be tied to the specific vendor of the user's CPU, for example, ABC Company's CPU. Thus, as shown, the key designation 240 (My current processor) and the corresponding bar graph portion 236 represent incentives for the user's current CPU (e.g., a 166 MHz processor). The key designation 238 represents the incentives that the user is projected to have if the user were to upgrade the CPU. Again, this upgrade incentive information may be tied to the specific vendor of the user's CPU or to any other vendor, if desired. Thus, as shown, the key designation 238 (NEW ABC 1 GHz processor!) and the corresponding bar graph portion 234 represent incentives for an upgrade to a new ABC CPU (e.g., a new ABC 1 GHz processor). In this manner, a user may be provided an incentive to increase the capabilities of the distributed device, and a vendor may be provided advertising so that the user is also directed to a particular upgrade.

Looking further to FIG. 2D, other similar incentive related information tabs may be provided for any desired capability of the distributed device. For example, tab 246 (Memory Values) represents information that may be provided for the memory capabilities of the distributed device. Tab 224 (Graphics Values) represents information that may be provided for the graphics capabilities of the distributed device. Tab 226 (Communications Values) represents information that may be provided for the communication capabilities of the distributed device. Tab 228 (Storage Values) represents information that may be provided for the storage capabilities of the distributed device. Tab 248 (System Values) represents information that may be provided for the system capabilities as a whole for the distributed device.

In addition to these incentive related information tabs, other tabs may be included to provide information and control for any desired features of the agent client manager. For example, the tab 244 (Current: Prime Search) represents information that may be displayed to the user about the current workload being performed by the agent client manager, for example, a search for large prime numbers. The tab 221 (Settings) represents information that may be displayed to the user about various settings for the client agent manager. In particular, the tab 221 may provide the user the ability to control any desired aspect of the operation of the agent client manager. For example, the user may be able to select a portion of the capabilities that may be utilized (e.g., a maximum of 20% of the system memory), the types of workloads that may be performed (e.g., only scientific research projects), the times when the agent may utilize system resources (e.g., only between 12 to 6 am, or only when the system is idle), or any other desired operational feature. It is noted that in addition to upgrade incentive information indicated above, the user may also be provided information as to how incentives would increase if the user allocated or changed the settings for the agent client manager.

Figure 3A:
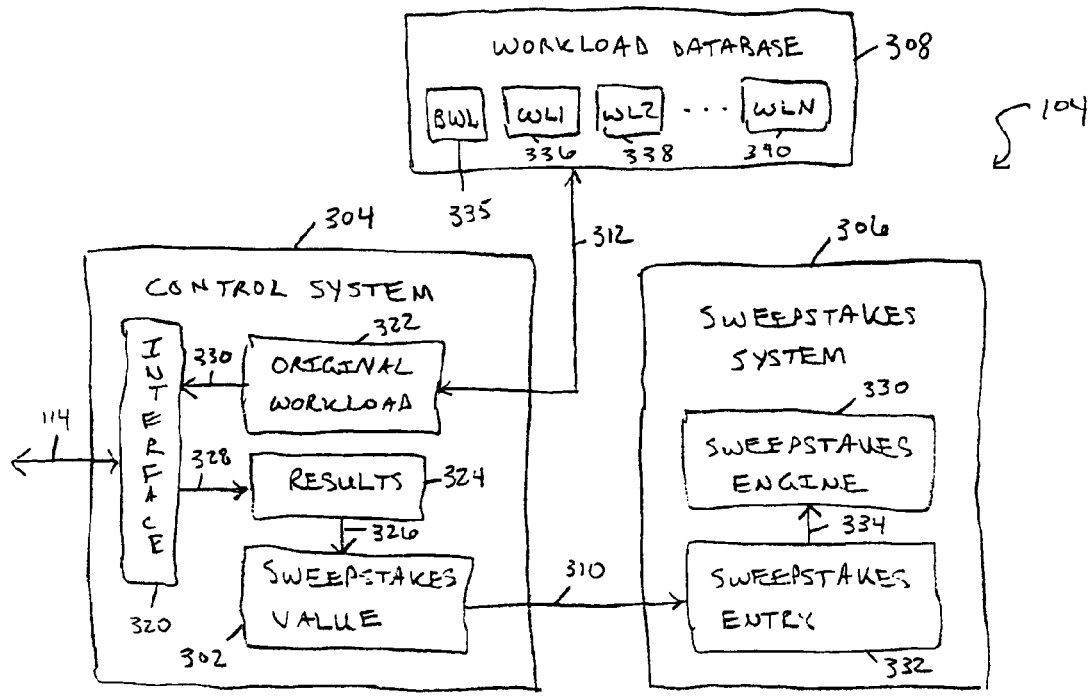
FIG. 3A is a block diagram for server systems, according to the present invention, including a control system, a sweepstakes system and a workload database.

Now looking to FIG. 3A, the server systems 104 may be one or more computer systems that operate to identify client system capabilities, organize workloads, and utilize client systems to accomplish a desired task. The server systems 104 includes a control system 304 a workload database 308, and a sweepstakes system 306, as discussed more below. The workload database 308 stores any desired project task, which may be broken up into discrete workload tasks WL1, WL2 . . . WLN, as represented by elements 336, 338 . . . 340. The workload database may also store one or more benchmark workloads (BWL) 335 that may be utilized to determine client system capabilities in response to a standard workload. Through line 312, the workload database 308 communicates with control system 304. Control system 304, for example, receives original workload 322 and transfers it to the interface 320 through line 330. The interface 320 then transfers the workload 322 to the network 102 through line 114. This workload 322 is ultimately received as workload 204 by client system 108, 110 or 112, as shown in FIG. 2A. The result 324 is ultimately received by the control system 304 through interface 320 and line 328.

In allocating workloads, the control system 304 may consider the capabilities of the client systems 108, 110 and 112 to which the control system 304 is sending workloads. For example, if client 108 has more processing power than client 110, the control system 304 may allocate and send more difficult or larger workloads. Thus, client 108 may receive WL1 336 and WL2 338, while client 110 would only receive WL3. Alternatively, the workload database 308 could be organized with differing levels of processing power or capability requirements for each workload. In this way, WL1 336 may represent a greater processing or system capability requirement than WL2 338. It should be noted that workload may be a processing task, a data storage task, or tied to any other of a variety of capabilities that may be utilized on the client systems 108, 110 . . . 112.

As indicated above, to encourage owners or users of client systems to allow their system capabilities to be utilized by control system 104, an incentive system may be utilized. This incentive system may be designed as desired. Incentives may be provided to the user or owner of the clients systems when the client system is signed-up to participate in the distributed processing system, when the client system completes a workload for the distributed processing system, or any other time during the process. In addition, incentives may be based upon the capabilities of the client systems, based upon a benchmark workload that provides a standardized assessment of the capabilities of the client systems, or based upon any other desired criteria.

One example use of a benchmark workload is to use the benchmark workload to determine incentive values. For example, the server systems 104 may be designed to send out a standard benchmark workload once an hour to each client system 108, 110 . . . 112. If a client system is not available at that time for any reason, the workload would not be completed by the client system, and there would be no incentive value generated for that client system. In this example, the benchmark workload may be a timed work-set that would exercise each subsystem with capabilities within the client system that was desired to be measured. A more capable client system would then generate greater incentive values from executing the benchmark workload, as compared to a lesser capable client system. These incentive values may be utilized as desired to determine what the client system should get in return for its efforts. For example, if the incentive were a sweepstakes as discussed further below, the number of entries in the sweepstakes may be tied to the system's performance of the benchmark workload. Thus, the faster or better the client system performs the benchmark workload, the more entries the client system would receive.

In the embodiment shown in FIG. 3A, the server systems 104 includes a sweepstakes system 306 that functions with control system 304 to provide incentives for the users or owners of client systems 108, 110 and 112 to allow their system capabilities to be used by the server systems 104. The control system 304 may determine a sweepstakes entry value 302 that is sent along line 310 to the sweepstakes system 306. The sweepstakes system 306 may then receive sweepstakes entry 332 and provide it to the sweepstakes engine 330 through line 334. The sweepstakes engine 330 may process the entries and determine a winner, when desired. In the embodiment shown, therefore, entries to the sweepstakes may be generated each time a unit of work is accomplished by one or more of the subsystems within a client system 108, 110 or 112 via an agent installed on the device for the purposes of managing and completing units of work. The total entries for any period of time would, therefore, be dynamic depending on how many are received. Odds of winning would then be determined by the total number of entries received and the total number of entries contributable to any given entrant.

Figure 3B:
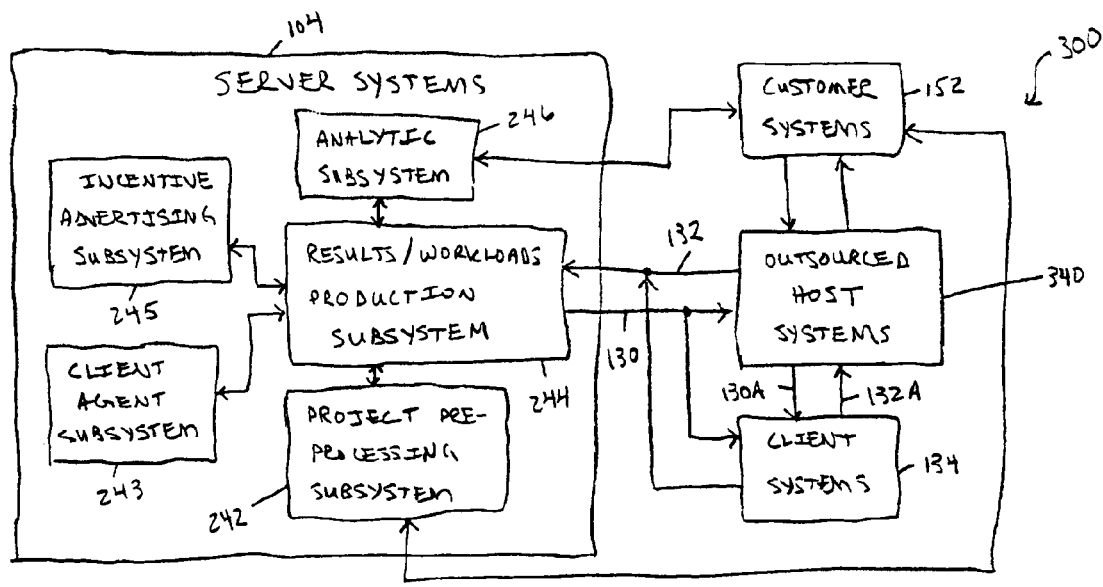
FIG. 3B is a block diagram for servers systems, customer systems, client systems and outsourced host systems, according to the present invention.

FIG. 3B is another example block diagram of a distributed processing system 300 including servers systems 104, customer systems 152, client systems 134 and out-sourced host systems 340, according to the present invention. The servers systems 104 may include an analytic subsystem 346, a results/workload production subsystem 344, a project pre-processing subsystem 342, a client agent subsystem 243, and an incentive advertising subsystem 245. The incentive advertising subsystem 245 may operate to provide advertising information, for example, the upgrade incentive information as discussed with respect to FIG. 2D. The client agent subsystem 243 may operate to download an agent to the client systems 134 and to update this agent at times when the server systems 104 are communicating with the client systems 134.

The customer systems 152, which represent customers that have projects that they desired to be processed by the distributed processing system, may be connected to the project pre-processing subsystem 342 to provide projects to the servers systems 104. These projects are processed by the project pre-processing subsystem 342 and passed to the results/workloads production subsystem 344, which produces and sends out workloads 130 and receives back results 130. The analytic system 346 then takes the results and processes them as desired. Completed project information may then be provided from the analytic system 346 to the customer systems 152. In this manner, the projects of the customer systems 152 may be processed and project results reported by the distributed processing system of the present invention.

Also, as shown, the workloads 130 and the results 132, or other tasks of the server systems 104, may be processed and handled by out-sourced host systems 340, if desired. Thus, some or all of the workloads 130 may be sent first to out-sourced host systems 340. Out-sourced host systems 340 then send workloads 130A to the client systems 134 and receive back results 132A. The out-sourced host systems 340 then send the results 132 back to the server systems 104. It is noted that this out-sourcing of server system tasks may be implemented as desired for any given task that the server systems 104 may have. It is further noted that, if desired, the server systems 104 may perform all of the desired functions of the server systems 104 so that no out-sourced host systems 340 would be used.

Figure 3C:
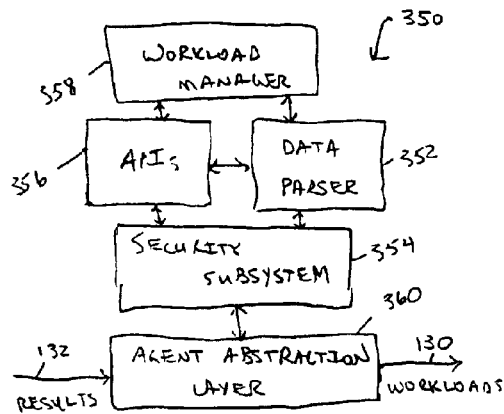
FIG. 3C is a block diagram for a server system processor, according to the present invention.

FIG. 3C is a block diagram for one embodiment of a server system processor 350, according to the present invention. An agent abstraction layer 360 may send workloads 130 and receive results 132. The security subsystem 354 may interact with the agent abstraction layer 360 and provide information to a data parser 352 and an application programming interface (APIs) block 356. The APIs block 356, the data parser 352 and a workload manager 558 may interact to accomplish the desired tasks for the server system processor 350. It is noted that for this embodiment, the API protocol could be controlled and provided to other host systems.

Figure 3D:
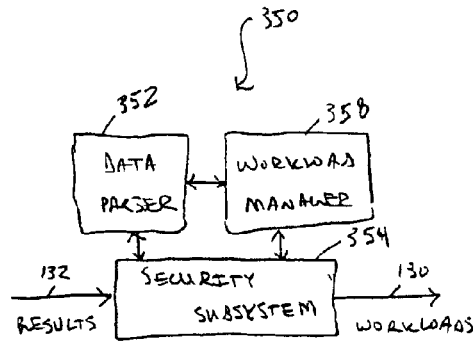
FIG. 3D is an alternative block diagram for a server system processor, according to the present invention.

FIG. 3D is an alternative block diagram for a server system processor 350, according to the present invention. In this embodiment, the APIs block 356 and the agent abstraction layer 360 are not present. The data parser 352, the workload manager 358 and the security subsystem 354 interact to provide the desired server system tasks. It is noted that for this embodiment, the security subsystem is controlled and utilized for communicating with client systems.

Figure 4:
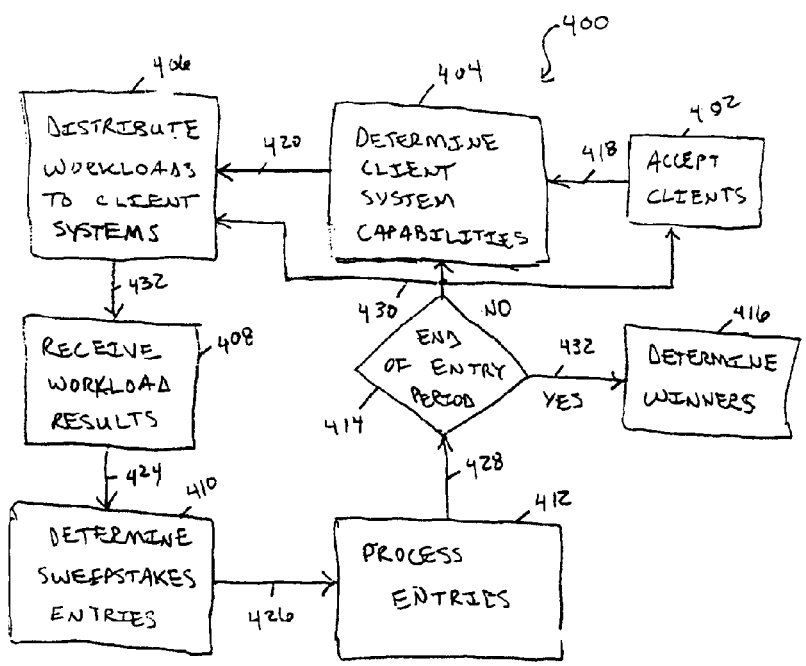
FIG. 4 is a functional block diagram for an example sweepstakes incentive operation according to the present invention.

FIG. 4 is a functional block diagram for a sweepstakes operation 400 by the system server 104 according to the present invention. In block 402, the server systems 104 may sign-up client systems in "accept clients" block 402. Following line 418, the server systems 104 identifies the capabilities of the client's computer and processing systems in the "determine client system capabilities" block 404. Control passes along line 420 to the "distribute workloads to client systems" block 406, where the server systems 104 allocates workloads to each client system 108, 110 and 112.

This workload may also be an benchmark workload, as indicated above, that acts as an entry workload to determine the entries or entry values for the client system. As also indicated above, in distributing the workloads in block 406, the server system 104 may take into consideration the capabilities of the client systems to which workloads are being distributed. The client systems 108, 110 and 112 then operate to complete the workloads allocated to them. The server system 104 receives back workload results in "receive workload results" block 408.

At this point, control passes along line 424 to the "determine sweepstakes entries" block 410. In this block 410, the server system 104 determines the entry value for the workload completed or for a standard benchmark or entry workload completed. This entry value may be weighted upon a variety of factors including factors such as the amount of work completed, the difficulty level of the processing required, and the accuracy of the results. It is noted that any desired weighting may be utilized. Thus, it is understood that a wide variety of considerations may be utilized to determine the entry value weighting for the sweepstakes.

Although the weighting determination is shown in block 410 in FIG. 4, the entry value may also be determined, in whole or in part, when a client system signs on to the distributed processing distributed system of the present invention. For example, if a client system has state-of-the-art CPU, video processor, DSP engine, memory, and large amounts of free disk storage space, a high entry value may be allocated to this client system up-front. In contrast, a client system that has a slow CPU, a weak video processor, no DSP engine, little memory, and little free disk storage space may be allocated a small entry value. In this way, the owners or users of the client systems may be provided immediate feedback as to the potential sweepstakes entry value of their computer systems, devices and system capabilities.

It is further noted that the entry value may take any desired form and may be, for example, a multiplier that will be used for each unit of workload completed. In this way, the owner or user will readily be cognizant that a state-of-the-art system will yield a high multiplier, where as an older system, system capability or device will yield a low multiplier. Such feedback, whether communicated to the owner or user immediately upon signing up or upon completion of each workload, will create an incentive for owners and/or users to acquire state-of-the-art systems, thereby further increasing the potential processing power of the distributed processing system of the present invention.

In addition, different workload projects may be designated with different entry values, as well. For example, some workload projects may require particular hardware or software processing systems within a client system or device. Thus, the number of client systems that are capable of performing the task would be limited. To further encourage participation by those owners or users with capable systems, the entry value for taking on particular workloads and/or systems with the desired features may be allocated higher entry values.

Referring back to FIG. 4, control passes along line 426 to the "process entries" block 412. In this block 412, the sweepstakes entries are processed and stored as desired. Following line 428, "end of entry period" decision block 414 represents a determination of whether the time for getting entries into the sweepstakes has ended. If not, the control continues to line 430 and back to blocks 402, 404 and/or 406, depending upon what is desired. Once the entry period has ended, control flows along line 432 to "determine winners" block 416. The server system 104 then identifies from among the entries, who the winning client system or systems will be.

The entry period may be any desired time frame and may include multiple overlapping time frames, as desired. For example, winners may be determined daily for entries each day, monthly for entries within a month, and/or yearly for entries within one year. In addition, special entry periods may be generated, if desired, for example where a particularly important workload project had a short time frame in which it needed to be completed.

Figure 5A:
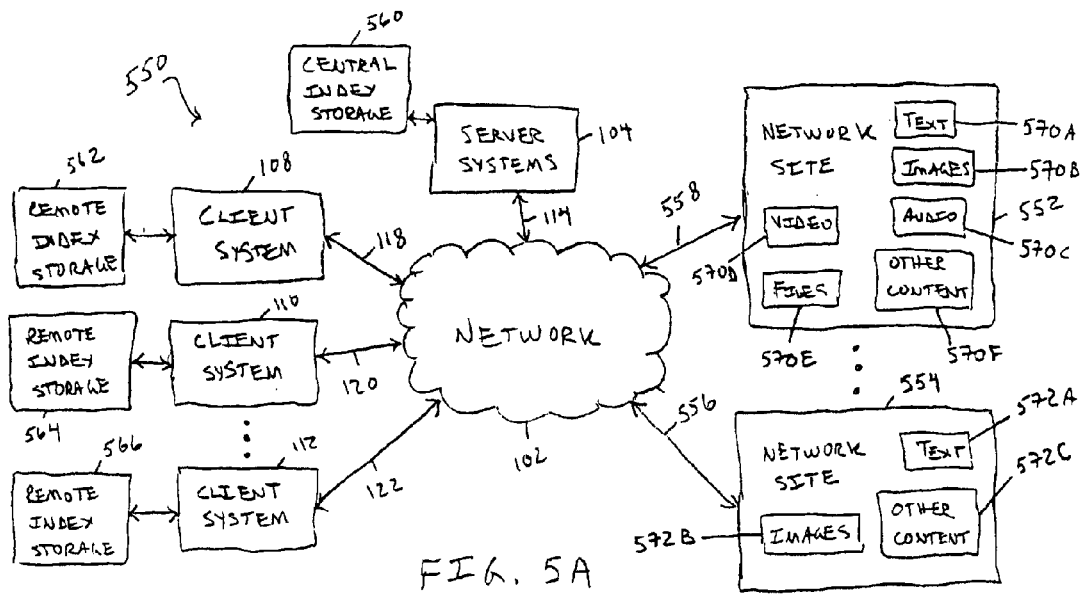
FIG. 5A is a block diagram for a distributed processing system for a network site indexing application, according to the present invention.
Figure 5B:
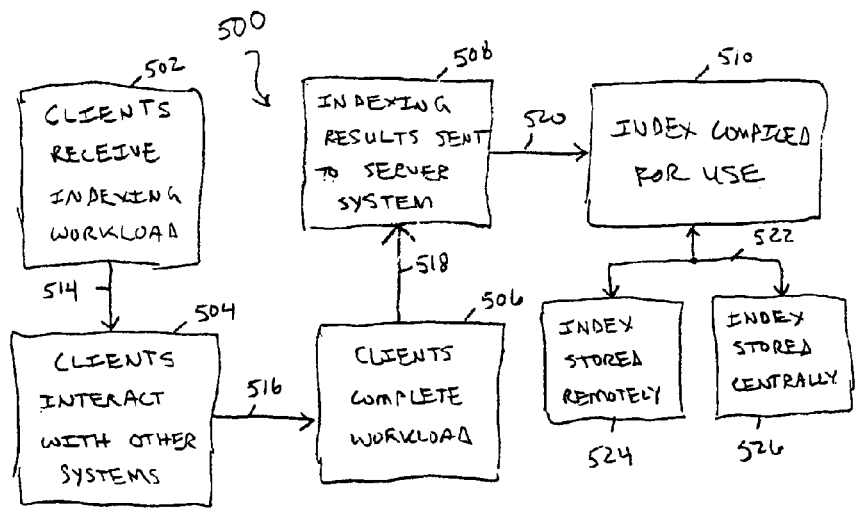
FIG. 5B is a functional block diagram for an indexing operation according to the present invention.
Figure 6A:
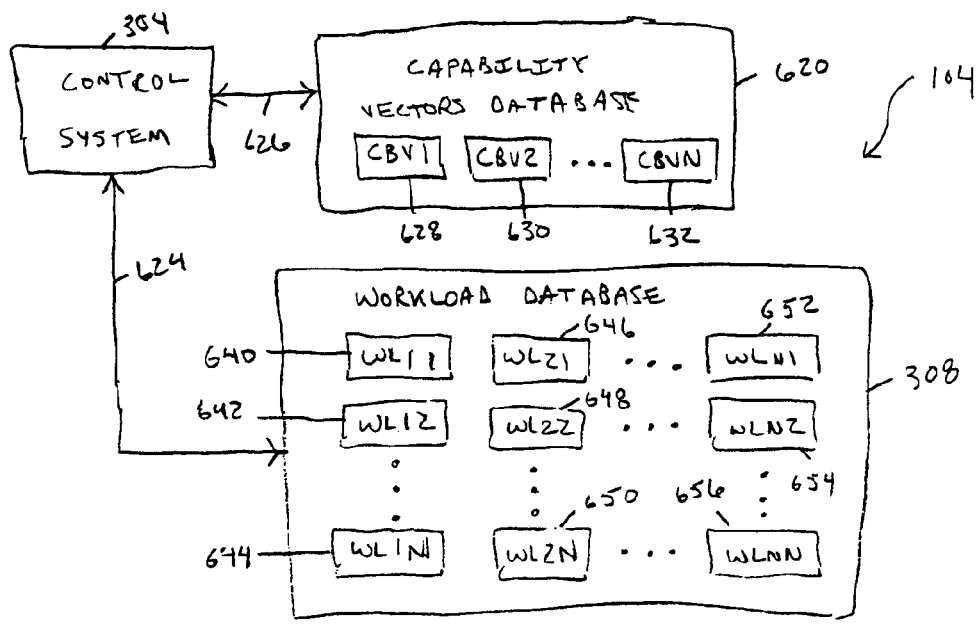
FIG. 6A is a block diagram for a server system according to the present invention, including a control system, a workload database, and a database of client capabilities balancing vectors.
Figure 6B:
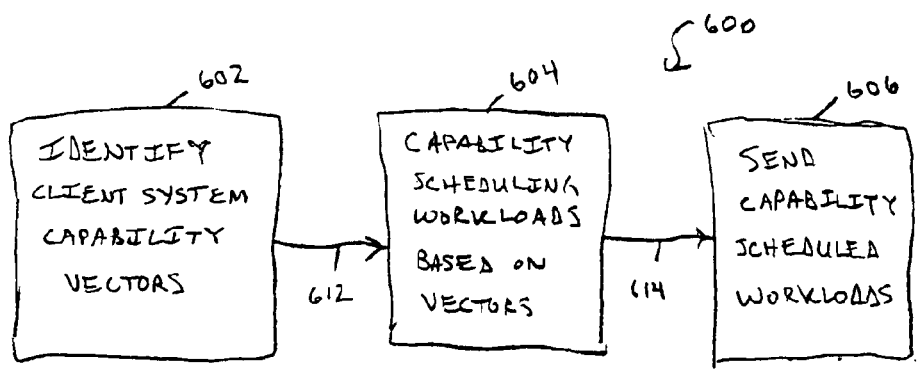
FIG. 6B is a functional block diagram for client capabilities balancing of workloads according to the present invention.
Figure 7A:
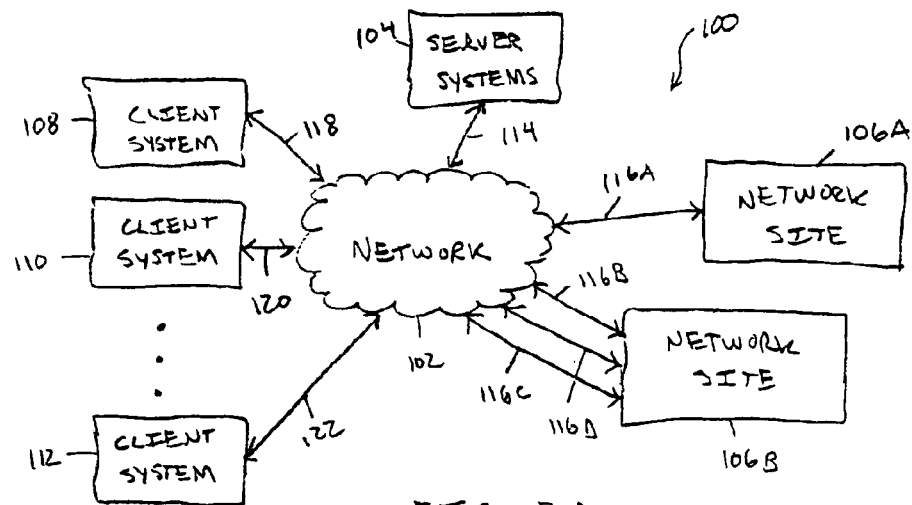
FIG. 7A is a block diagram for a distributed processing system, according to the present invention, including example network sites on which site testing is to be conducted, such as load testing and/or quality-of-service (QoS) testing.
Figure 7B:
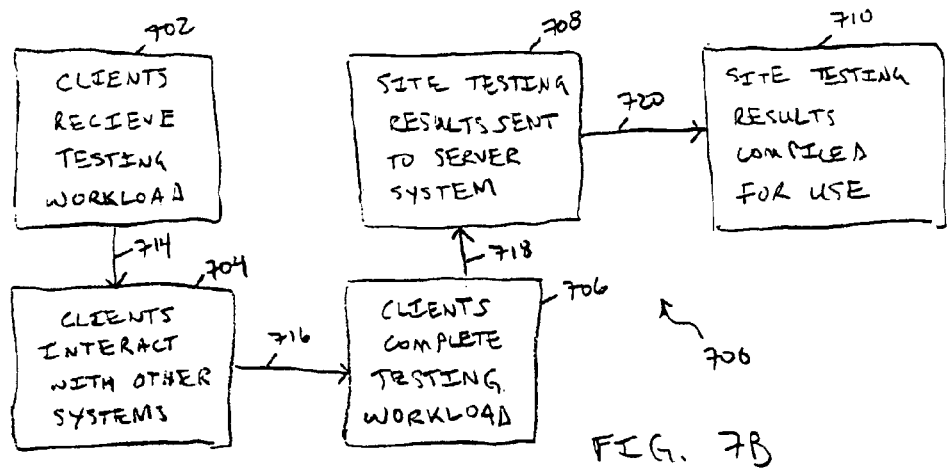
FIG. 7B is a functional block diagram for site-testing, according to the present invention.

FIGS. 1, 2A–C, 3A–D, and 4 are directed to example embodiments for a distributed processing system according to the present invention, including a sweepstakes reward or incentive feature, as shown in the embodiments of FIG. 3A and FIG. 4. FIGS. 6A and 6B further describe a capabilities scheduling feature, in which the server systems 104 may identify and consider any of a variety of client system capability vectors in determining how to organize, allocate and manage workloads and projects. FIGS. 5A and 5B describe a distributed processing system and workload project that accomplishes network site indexing. FIGS. 7A and 7B describe a distributed processing system and a workload project that accomplishes network site testing, such as quality of service (QoS) testing and load testing. And FIG. 8 describes a distributed processing system, preferably with respect to a corporate intranet, that accomplishes distributed data back-up.

FIG. 5A is a block diagram for a distributed processing system 550 for a network site indexing application, according to the present invention. As stated above with respect to FIG. 1A, the network 102 may be a wide variety of networks. For this network site indexing application, the network 102 may preferably be the Internet having a multitude of network sites 552 . . . 554. Each network site 552 . . . 554 may have a variety of different content types that may be indexed, ranging from complex sites to relatively simple sites. For example, network site 552 includes text 570A, images 570B, audio streams 570C, video streams 570D, files 570E and other content 570F. Network site 554 is less complex and includes text 572A, images 572B, and other content 572C. Both network sites 552 and 554 are connected to the network 102 through communication lines 558 and 556, respectively.

As discussed above, the server systems 104 manage workloads for the client systems 108, 110 . . . 112. The client systems 108, 110 . . . 112 process these workloads and produce indexing results. The resulting index may be stored at a centrally managed site, such as central index storage block 560, or may itself be distributed over the possibly millions of indexing clients 108, 110 . . . 112, as shown by remote index storage blocks 562, 564 . . . 566. If remote index storage is utilized, a master database content index may be stored locally, for example, in the central index storage block 560. This content index may then direct relevant searches to the distributed massively parallel engine for search queries.

Referring now to FIG. 5B, a functional block diagram is shown for a network site indexing operation 500 according to the present invention. As described in FIG. 1 with respect to other systems 106, there may be any number of computer and processing systems connected to the network 102. Any one of these others systems 106 may publish information on the network 102 for access by any other system connected to the network 102. This information to be indexed may take a wide variety of forms, including, for example, text, images, audio streams, video streams, databases, spreadsheets, PDF files, Shockwave data, Flash data, applications, data files, chat streams, or any other information, data or data streams that may be accessible on a network site. The distributed processing system of the present invention may have as a workload the task of indexing this potentially massive amount of information.

For example, where the network 102 is the Internet or a large intranet, a large amount of processing power and time is needed to create an accurate, complete and up-to-date index of the information. The Internet uses an IP (Internet Protocol) address protocol to direct traffic around the Internet. The IP address is the address of a computer attached to a TCP/IP (Transmission Control Protocol/Internet Protocol) network. Every system on the network must have a unique IP address. IP addresses are typically written as four sets of numbers separated by periods. The TCP/IP packet uses 32 bits to contain the IP address, which is made up of a network and host address (NETID and HOSTID). The more bits used for network address, the fewer remain for hosts. Web pages within a particular web site with a unique address may be addressed through URLs (Uniform Resource Locator) associated with that web site. In short, there is a limited, but very large, number of possible IP addresses for uniquely identifiable Internet sites that may be accessed and analyzed to generate an index of Internet sites and web pages via URLs.

The operation diagram of FIG. 5B starts with the "clients receive indexing workloads" block 502. In this block, the system server 104 provides the clients systems 108, 110 . . . 112 with a workload task to index a portion of the information accessible on the network 102. For example, with the Internet, each workload may be single IP address or groups of URLs or, in some cases, large data types contained on single sites or pages. Following line 514, the "clients interact with other systems" block 504 represents the operation of the agent installed on the client systems 108, 110 . . . 112 to access the network sites, according to the assigned workload, and index the information accessible on that site. This indexing may include all types of information accessible on that site, including text, audio, image, video, etc.

Next, following lines 516 and 518, the client systems 108, 110 and 112 complete the workload tasks, get the results ready for transmission, and sends those results back to the system server 104 in "clients complete workload" block 506 and "indexing results sent to server system" block 508. Control passes along line 520 to "index compiled for use" block 510 where the server system formats and/or compiles the results for use. For example, the index results may be utilized for accurate, complete and up-to-date search information for the network 102. As indicated with respect to FIG. 5A, the resulting index may be stored remotely or locally following line 522. Thus, element 524 represents remote storage of the index, and element 526 represents central storage of the index. It is noted that the index may also be stored with a mixture of central and remote storage, as desired. In addition, as indicated above, a directory or summary index for the resulting index may be generated and stored centrally, if desired.

FIG. 6A is a block diagram for a server system 104 according to the present invention, including a control system 304, a workload database 308, and a database of capability vectors 620. The workload database 308 includes a variety of sets of workload projects WL1, WL2 WLN. For each workload project, there may be multiple workload units. For example, workload project WL1 includes workload units WL11, WL12 . . . . WL1N, as represented by elements 640, 642 . . . 644, respectively. Similarly, workload project WL2 includes workload units WL21, WL22 . . . WL2N, as represented by elements 646, 648 . . . 650, respectively workload project WL3 includes workload units WL31, WL32 . . . WL3N, as represented by elements 652, 654 . . . 656, respectively.

It may be expected that different workload projects WL1, WL2 . . . WLN within the workload database 308 may require widely varying processing requirements. Thus, in order to better direct resources to workload projects, the server system may access various system vectors when a client system signs up to provide processing time and other system or device capabilities to the server system. This capability scheduling helps facilitate project operation and completion. In this respect, the capability vector database 620 keeps track of any desired feature of client systems or devices in capability vectors CBV1, CBV2 . . . CBVN, represented by elements 628, 630 . . . 632, respectively. These capability vectors may then be utilized by the control system 304 through line 626 to capability balance workloads.

This capability scheduling according to the present invention, therefore, allows for the efficient management of the distributed processing system of the present invention. This capability scheduling and distribution will help maximize throughput, deliver timely responses for sensitive workloads, calculate redundancy factors when necessary, and in general, help optimize the distributed processing computing system of the present invention. The following TABLE 1 provides lists of capability vectors or factors that may be utilized. It is noted that this list is an example list, and any number of vectors or factors may be identified and utilized, as desired.

TABLE 1

Example Client Capability Vectors or Factors

1. BIOS Support:

a. BIOS Type (brand)
b. ACPI
c. S1, S2, S3, and S4 sleep/wake states
d. D1, D2 and D3 ACPI device states
e. Remote Wake Up Via Modem
f. Remote Wake Up Via Network
g. CPU Clock Control
h. Thermal Management control
i. Docked/Undocked state control
j. APM 1.2 support
k. Hotkey support
l. Resume on Alarm, Modem Ring and LAN
m. Password Protected Resume from Suspend
n. Full-On power mode
o. APM / Hardware Doze mode
p. Stand-by mode
q. Suspend to DRAM mode
r. Video Logic Power Down
s. HDD, FDD and FDC Power Down
t. Sound Chip Power Down
u. Super I/O Chip Power Down 2. CPU Support:

a. CPU Type (brand)
b. MMX instruction set
c. SIMD instruction set
d. WNI instruction set
e. 3DNow instruction set
f. Other processor dependent instruction set(s)
g. Raw integer performance
h. Raw FPU performance
i. CPU L1 data cache size
j. CPU L1 instruction cache size TABLE 1-continued Example Client Capability Vectors or Factors k. CPU L2 cache size
l. CPU speed (MHz/GHz . . . )
m. System bus (MHz/GHz . . . ) speed supported
n. Processor Serial Number
o. CPUID
3. Graphic Support a. Graphics type (brand)
b. # of graphics engines
c. Memory capacity
d. OpenGL support
e. Direct3D/DirectX support
f. Color depth supported
g. MPEG 1/II decode assist
h. MPEG1/II encode assist
i. OS support
j. Rendering type(s) supported
k. Single-Pass Multitexturing support
l. True Color Rendering
m. Triangle Setup Engine
n. Texture Cache
o. Bilinear/Trilinear Filtering
p. Anti-aliasing support
q. Texture Compositing
r. Texture Decompression
s. Perspectively Correct Texture Mapping
t. Mip-Mapping
u. Z-buffering and Double-buffering support
v. Bump mapping
w. Fog effects
x. Texture lighting
y. Video texture support
z. Reflection support
aa. Shadows support
4. Storage Support a. Storage Type (brand)
b. Storage Type (fixed, removable, etc.)
c. Total storage capacity
d. Free space
e. Throughput speed
f. Seek time
g. User dedicated space for current workload
h. SMART capable
5. System a. System Type (brand)
b. System form factor (desktop, portable, workstation, server, etc.)
6. Communications Support a. Type of Connection (brand of ISP)
b. Type of Connection Device (brand of hardware)
c. Hardware device capabilities
d. Speed of connection
e. Latency of connection
f. Round trip packet time of connection
g. Number of hops on connection type
h. Automatic connection support (yes/no)
i. Dial-up only (yes/no)
j. Broadband type (brand)
k. Broadband connection type (DSL/Sat./Cable/T1/Intranet/etc.)
7. Memory a. Type of memory error correction (none, ECC, etc.)
b. Type of memory supported (EDO, SDRAM, RDRAM, etc.)
c. Amount of total memory
d. Amount of free memory
e. Current virtual memory size
f. Total available virtual memory size
8. Operating System a. Type of operating system (brand)
b. Version of operating system
c. Health of operating system FIG. 6B is a functional block diagram for capabilities determination and scheduling operation 600 for workloads in a distributed processing system according to the present invention. Initially, various vectors are identified for which capability information is desired in the "identify client system capability vectors" block 602. Following line 612, the server systems 104 then capability balances workloads among client systems 108, 110 and 112 based upon the capability vectors in the "capability scheduling workloads based on vectors" block 604. Then the capabilities scheduled workloads are sent to the client systems 104 for processing in the "send capability scheduled workloads" block 606.

FIG. 7A is a block diagram for a network 102 according to the present invention, including example network sites 106A and 106B on which site testing is to be conducted, such as load testing and/or quality-of-service (QoS) testing. FIG. 7A is similar to FIG. 1 except that other systems 106 in FIG. 1 has been represented in the embodiment of FIG. 7A with network sites 106A and 106B. Communication line 116A between the network 102 and the network site 106A represents a interaction by one client system 108, 110 and 112. Communication lines 116B, 116C and 116D represent interactions by more than one client system 108, 110 and 112.

Site testing is typically desired to determine how a site or connected service performs under any desired set of test circumstances. With the distributed processing system of the present invention, site performance testing may be conducted using any number of real client systems 108, 110 and 112, rather than simulated activity that is currently available. Several tests that are commonly desired are site load tests and quality of service (QoS) tests. Quality of service (QoS) testing refers to testing a user's experience accessing a network site under normal usability situations. Load testing refers to testing what a particular network site's infrastructure can handle in user interactions. An extreme version of load testing is a denial-of-service attack, where a system or group of systems intentionally attempt to overload and shut-down a network site. Advantageously, the current invention will have actual systems testing network web sites, as opposed to simulated tests for which others in the industry are capable.

Network site 106B and the multiple interactions represented by communication lines 116A, 116B and 116C are intended to represent a load testing environment. Network site 106A and the single interaction 116A is indicative of a user interaction or QoS testing environment. It is noted that load testing, QoS testing and any other site testing may be conducted with any number of interactions from client systems desired, and the timing of those interactions may be manipulated and controlled to achieve any desired testing parameters. It is further noted that periodically new load and breakdown statistics will be provided for capacity planning.

FIG. 7B is a functional block diagram for a site-testing operation 700 according to the present invention. Initially, client systems 108, 110 and 112 receive workloads that identify testing procedures and parameters in the "clients receive testing workload" block 702. Following line 714, the client systems 108, 110 and 112 access the site being tested and perform the testing in block "clients interact with other systems" block 704. Next, following lines 716 and 718, the client systems 108, 110 and 112 complete the site testing workload tasks, get the results ready for transmission, and send those results back to the system server 104 in "clients complete testing workload" block 706 and "site testing results sent to server system" block 708. Control passes along line 720 to "site testing results compiled for use" block 510 where the server system formats and/or compiles the results for use by the network site. For example, the site testing results may be utilized determining modifications that need to be made to the network site to handle peak volume activities.

Figure 8:
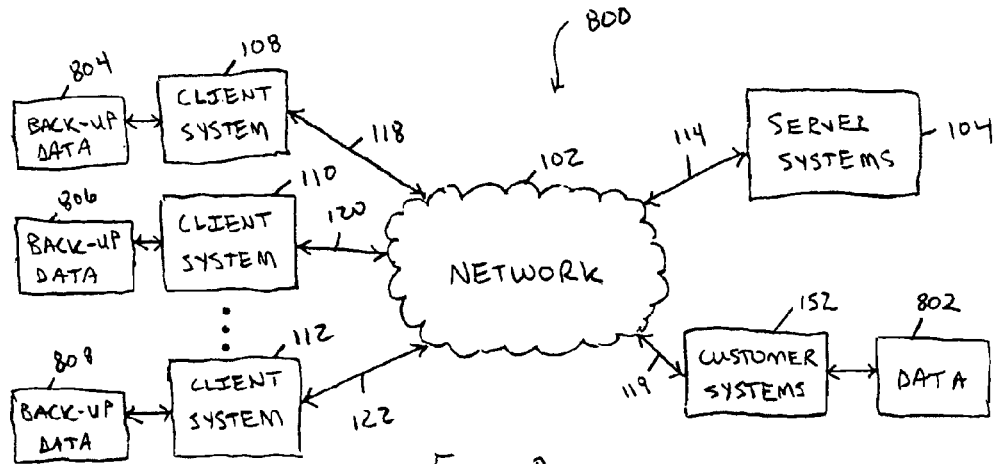
FIG. 8 is a block diagram for a distributed processing system for a data backup application, according to the present invention.

FIG. 8 is a block diagram for a distributed processing system 800 for a data back-up system application, according to the present invention. As stated above with respect to FIG. 1A, the network 102 may be a wide variety of networks, including an intranet network. Intranet networks, such as internal networks set up by corporations, are particularly suited for this application because the systems holding the data being backed-up would be owned by the same entity owning other systems with excess data storage capabilities. In this way, security would not be as great of an issue and the client system types could be better controlled. It is noted, however, that this data back-up application would be equally applicable to other networks, such as for computer systems connected through the Internet.

Referring back to FIG. 8, client systems 108, 110 . . . 112 are shown each having a back-up data blocks 804, 806 . . . 808. Customer systems 152 is shown as having data 802, which is desired to be backed-up with the distributed back-up system 800. The server systems 104 manage the flow of data from the data 802 and the client systems that have extra storage space represented by back-up data blocks 804, 806 . . . 808. In operation, the server systems 104 identifies client system storage capabilities. With this information, the server systems 104 can receive data for back-up from any system on the network 102. It is noted, and as indicated with respect to FIG. 1A, the client systems 108, 110 . . . 112 and the customer systems 152 may communicate directly with each other in peer-to-peer type communications.

The servers systems 104 may also manage the storage and transfer of data so that the data will be readily retrievable once backed-up and stored on the client systems 108, 110 . . . 112. If desired, an summary index or directory of the backed-up data may be stored centrally on the server systems 104, or may be stored remotely on the client systems 108, 110 . . . 112. It is also noted that the server systems 104 may also distribute data back-up workloads so that each portion of the data 802 is stored redundantly on at least two of the client systems 108, 110 . . . 112. This redundancy provides added security should any one or more client systems suddenly cease to be operational.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size and arrangement of parts. For example, equivalent elements may be substituted for those illustrated and described herein, and certain features of the invention may be utilized independently of the use of other features, all as would be apparent to one skilled in the art after having the benefit of this description of the invention.

I claim:

1. A method operating a distributed processing system having a network coupling a number M of Host distributed devices to process workloads for the distributed processing system, a plurality of Client systems requesting processing of the workloads, one or more network sites coupled to the network for providing services upon request to a multiplicity of Host distributed devices including at least the M Host distributed devices, and a Server system for selectively distributing the workloads for processing by the distributed processing system comprising the steps of:
   a) sending a software agent to a number N of Host distributed devices selected from the M Host distributed devices, the software agent configured to start a program execution at a predetermined first time interval;
   b) sending a test program to each of the N Host distributed devices, wherein the test program is configured to request a service from a first network site selected from the one or more network sites; and
   c) sending a request to each of the N Host distributed devices to concurrently start execution of the test program at the first time interval.

2. The method of claim 1 further comprising the step of receiving, in the Server system, a status from each of the N Host distributed devices in a second time interval following the first time interval, the status indicating a quality of providing the service to each of the N Host distributed devices.

3. The method of claim 2, wherein the status is generated automatically by the N Host distributed devices following the first time interval.

4. The method of claim 2, wherein the status is generated in response to a request from the Server system.

5. The method of claim 1 further comprising the steps of:
   d) determining if any of the N Host distributed devices had a failure in receiving the service requested by running the test program;
   e) increasing the number N if no failure was detected; and
   f) repeat steps a) through e) until the failure is detected from at least one of the N Host distributed devices or N is equal to M.

6. The method of claim 1 further comprising the step of: receiving a request from one of the Client systems to test a network site coupled to the network.

7. The method of claim 1, wherein the test program sent to each of the N Host distributed devices is the same test program.

8. The method of claim 1, wherein each of the N Host distributed devices is sent a different test program, wherein each test program requests a different service from the first network site.

9. The method of claim 1, wherein the M Host distributed devices are coupled to the network in response to an incentive.

10. The method of claim 1, wherein the first network site is an internet web site.

11. The method of claim 1, wherein the first time interval is selected to coincide with a peak time the first network site receives requests from the multiplicity Host distributed devices excluding the N Host distributed devices.

12. The method of claim 2, wherein the quality of service comprises a response time in providing the service to a particular one of the N Host distributed devices.

13. A computer program product operating within a Server system coupled to a network and managing a distributed processing system, the network configured to enable the Server system to selectively couple a number M of Host distributed devices to perform workloads for the distributed processing system, the program product comprising a program of instructions for performing the program steps of:
   a) sending a software agent to a number N Host distributed devices selected from the M Host distributed devices, the software agent configured to start a program execution at a predetermined first time interval;

b) sending a test program to each of the N Host distributed devices, wherein the test program is configured to request a service from a first network site selected from the one or more network sites; and c) sending a request to each of the N Host distributed devices to concurrently start execution of the test program at the first time interval.

14. The computer program product of claim 13 further comprising the step of receiving, in the Server system, a status from each of the N Host distributed devices in a second time interval following the first time interval, the status indicating a quality of providing the service to each of the N Host distributed devices.

15. The computer program product of claim 14, wherein the status is generated automatically by the N Host distributed devices following the first time interval.

16. The computer program product of claim 14, wherein the status is generated in response to a request from the Server system.

17. The computer program product of claim 13 further comprising the steps of:

d) determining if any of the N Host distributed devices had a failure in receiving the service requested by running the test program;

e) increasing the number N if no failure was detected; and f) repeat steps a) through e) until the failure is detected from at least one of the N Host distributed devices or N is equal to M.

18. The computer program product of claim 13 further comprising the step of:

receiving a request from one of the Client systems to test a network site coupled to the network.

19. The computer program product of claim 13, wherein the test program sent to each of the N Host distributed devices is the same test program.

20. The computer program product of claim 13, wherein each of the N Host distributed devices is sent a different test program, wherein each test program requests a different service from the first network site.

21. The computer program product of claim 13, wherein the M Host distributed devices are coupled to the network in response to an incentive.

22. The computer program product of claim 13, wherein the first network site is an internet web site.

23. The computer program product of claim 13, wherein the first time interval is selected to coincide with a peak time the first network site receives requests from the M Host distributed devices excluding the N Host distributed devices.

24. The computer program product of claim 14, wherein the quality of service comprises a response time in providing the service to a particular one of the N Host distributed devices.

25. A software agent operating within each of a multiplicity of Host distributed devices coupled to a network, the network configured to enable a Server system to selectively couple the multiplicity of Host distributed devices to perform workloads for a distributed processing system, the software agent comprising a program of instructions for performing the program steps of:

receiving a request from the server system to process a test program workload in one of the multiplicity of Host distributed devices for testing a site coupled to the network;

receiving the test program and a predetermined first time interval, the test program configured to request a service by accessing the site;

starting an execution of the test program in a first Host distributed device selected from the multiplicity of Host distributed devices at the first time interval; and sending a status to the Server system at a second time following the first time-interval, the status indicating a quality of service provided to the first Host distributed device at the first time interval.

26. The software agent of claim 25, wherein the status is determined by monitoring a response sent to the first Host distributed device by the site following the first time interval.

* * * * *